United States Patent [19]

Miyahara et al.

[11] Patent Number: 5,238,420
[45] Date of Patent: Aug. 24, 1993

[54] BRUSHLESS ELECTRIC SIGNAL TRANSMISSION APPARATUS

[75] Inventors: Masato Miyahara; Takashi Kawahara, both of Tokyo; Kazuhisa Kubota, Niwa, all of Japan

[73] Assignee: The Furukawa Electric Co., Ltd., Tokyo, Japan

[21] Appl. No.: 903,876

[22] Filed: Jun. 25, 1992

[30] Foreign Application Priority Data

Jun. 28, 1991 [JP] Japan .................. 3-049981[U]

[51] Int. Cl.$^5$ .................................. H01R 39/02
[52] U.S. Cl. .................................. 439/164; 439/15
[58] Field of Search .................................. 439/15, 164

[56] References Cited
U.S. PATENT DOCUMENTS 5,151,042 9/1992 Okada .................. 439/164

*Primary Examiner*—Eugene F. Desmond
*Attorney, Agent, or Firm*—Frishauf, Holtz, Goodman & Woodward

[57] ABSTRACT

A brushless electric signal transmission apparatus comprising inner and outer housings coupled rotatably, a flat cable accommodated in an eddy form between these housings and including a plurality of conductors, plug-type connectors respectively mounted on opposite end portions of the flat cable, sockets into which the plug-type connectors are inserted, and covered lead wires which are the same in number as the flat cable conductors. Most of the flat cable conductors are connected to their corresponding covered lead wires via the plug-type connectors and the sockets. The unset flat cable conductors are connected to the unset covered lead wires via bus bars provided at the plug-type connectors.

12 Claims, 2 Drawing Sheets

BRUSHLESS ELECTRIC SIGNAL TRANSMISSION APPARATUS

BACKGROUND OF THE INVENTION

The present invention relates to a brushless electric signal transmission apparatus capable of effecting electric signal transfer between a stationary member and a rotary member, and more particularly, to this kind of an apparatus which is easy to assemble.

A brushless electric signal transmission apparatus has been used for electrically connecting a steering wheel and a steering column of the automobile, for instance. The brushless apparatus of this kind for the steering system allows a horn signal and an automatic driving signal to be transmitted from switches located at the steering wheel to a controller, etc. at the side of the vehicle body via the steering column, regardless of a rotary position of the steering wheel.

In the case of an automobile provided with an air bag system, moreover, the brushless apparatus is also used for electrically connecting a shock sensor and a diagnosis unit disposed on the vehicle body to an inflator of the air bag at the side of the steering wheel, regardless of a rotary position of the steering wheel.

The above-described apparatus comprises a stationary housing fixed to the steering column, a rotary housing fitted thereto and coupled to the steering wheel, i.e., a steering shaft, and a flat cable of an eddy or spiral form housed within a ring chamber located between the stationary housing and the rotary housing.

The respective terminal ends of conductors, which form the flat cable, at the side of the rotary housing are electrically connected to the switches and the inflator at the side of the steering wheel via flexible covered lead wires, while the terminal ends of these conductors at the side of the stationary housing are also electrically connected to the controller and the diagnosis unit via flexible covered lead wires.

When the above-described apparatus is assembled, each of the conductors of the flat cable is welded or soldered to its counterpart, i.e., a corresponding one of the covered lead wires, directly, or via a bus bar.

However, when the conductor and the covered lead wire are welded or soldered for mutual connection, since the latter is flexible, it is difficult to connect them, and further, since the lead wire is usually made of a strand, its cores are easy to come apart, which makes the connecting work difficult.

OBJECT AND SUMMARY OF THE INVENTION

An object of the present invention is to provide a brushless electric signal transmission apparatus which allows the electrical connection between most of conductors, forming a flat cable, and covered lead wires to be readily achieved upon assemblage of the apparatus, without the need of welding or soldering them directly or via a bus bar, so as to greatly raise the percentage of automated fabrication of the apparatus, to thereby reduce manufacturing costs and improve the quality of the apparatus.

Another object of the present invention is to provide a brushless electric signal transmission apparatus wherein a desired one or ones of flat cable conductors and an associated one or ones of covered lead wires, which separately require reliability in electrical connection, are securely connected.

According to the present invention, a brushless electric signal transmission apparatus comprises inner and outer housings fitted to each other for relative rotation, and a flat cable including a plurality of conductors. The flat cable is housed in a spiral form within a ring chamber defined by the housings, and is adapted to be wound or unwound during the relative rotation of the housings. First covered lead wires are connected to part of the plurality of conductors of the flat cable at one end side of the flat cable through a first connector having a first plug and a first socket into which the first plug is inserted. At least one second covered lead wire is connected, by welding or soldering, to a remaining part of the plurality of the conductors of the flat cable at the one end side of the flat cable.

Preferably, in the brushless electric signal transmission apparatus, third covered lead wires are connected to part of the plurality of conductors of the flat cable at another end side of the flat cable through a second socket having a second plug and a second socket into which the second plug is inserted, and at least one fourth covered lead wire is connected, by welding or soldering, to a remaining part of the plurality of conductors of the flat cable at another end side of the flat cable.

Preferably, the outer housing is further provided with a cable outlet portion having an opening end which is in communication with the ring chamber and through which the flat cable extends, and a counterpart, i.e., a corresponding one of the first and second connectors is mounted on the opening end of the cable outlet portion. The inner housing has a flange portion extending along an open end surface of the outer housing and formed with a cable aperture through which the flat cable extends, and a corresponding one of the first and second connectors is mounted on the flange portion in alignment with the cable aperture of the flange portion. Preferably, the brushless electric signal transmission apparatus further includes a clip which is mounted on a corresponding one of the first and second connectors, and the clip has two chucking pieces for positioning and retaining the second or fourth covered lead wire. Each of the covered lead wires may be flexible, and the covered lead wires may be grouped together into a single strand.

DETAILED DESCRIPTION

Figure 1:
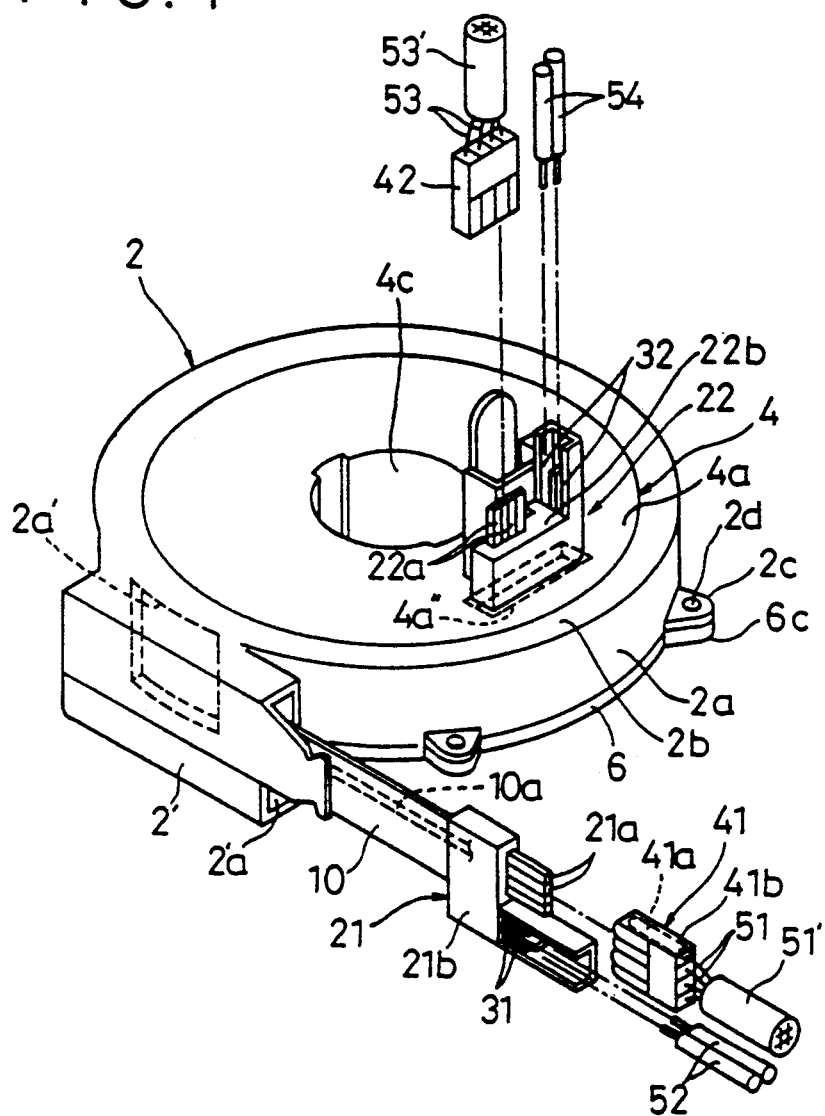
FIG. 1 is a partially exploded perspective view illustrating a brushless electric signal transmission apparatus according to an embodiment of the present invention, with a connector dismounted from an outer housing.
Figure 2:
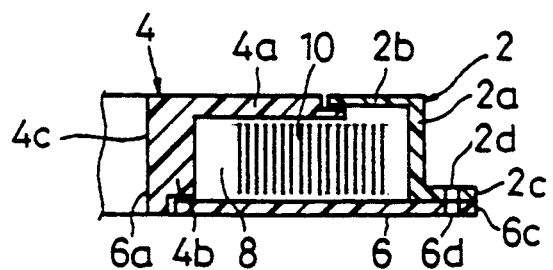
FIG. 2 is a fragmentary cross-sectional view of the apparatus of FIG. 1.

Referring to FIGS. 1 and 2, a brushless electric signal transmission apparatus is shown, which is incorporated within a steering column (not shown) of an automobile. The brushless apparatus is provided with an outer housing 2 which is formed, as a whole, into a flat, hollow and cylindrical form. The outer housing has a peripheral wall 2a, and an annular end wall 2b formed integrally therewith at one peripheral edge side of the peripheral wall 2a. Most of the end surface (upper surface) of the housing 2 on the annular end wall side and the entire opposite end surface (lower surface) of the housing 2 are open. An inner housing 4 is disposed within the outer housing 2 coaxially therewith, and is rotatably fitted within the outer housing 2. The inner housing 4 has a flange portion 4a extending along the open end surface of the outer housing 2 at the side of the annular end wall 2b and closing the open end surface, and a boss portion 4b integrally formed with the flange portion 4a at the center of the flange portion 4a and extending toward the interior of the outer housing 2 along the axes of these housings 2 and 4.

The open end surface of the outer housing 2 at the side remote from the annular end wall 2b is substantially entirely covered with a cover 6 which forms a disk plate. The cover 6 and the outer housing 2 are integrally formed with lugs 2c and 6c, respectively, which lugs radially outwardly protrude from the outer peripheral surfaces of these elements 6 and 2. The cover 6 and the outer housing 2 are combined to each other by means of fastener bolts (not shown) inserted through holes 2d, 6d formed in the lugs 2c, 6c, with corresponding ones of the lugs 2c and 6c overlapped with each other. At the center of the cover 6, a hole 6a is formed in alignment with a hole 4c formed in the boss portion 4b of the inner housing 4.

The outer housing 2 is adapted to be fixed within the steering column, while a steering shaft (not shown) is adapted to be inserted into the hole 4c of the boss portion 4b of the inner housing 4 and the hole 6a of the cover 6. When the steering shaft is inserted, the steering shaft and the inner housing 4 are engaged with each other, whereby the inner housing 4 is arranged to be rotated in unison with the steering shaft, i.e., the steering wheel (not shown). Incidentally, the aforementioned outer and inner housings 2, 4 and the cover 6 are each made of synthetic resin.

A ring chamber 8 is formed between the inner surfaces of the peripheral and end walls 2a, 2b of the outer housing 2, the outer surfaces of the disk and boss portions 4a, 4b of the inner housing 4, and the housing side surface of the cover 6. A flat cable 10 is accommodated in the ring chamber 8 in an eddy or spiral form. The flat cable 10, which is used for transmitting various electric signals, has a plurality of, e.g., six, conductors (one of which is shown by reference numeral 10a in FIG. 1) each covered with an insulating covering.

A cable outlet portion 2' is formed in the outer housing 2 integrally therewith and in alignment with a cable hole 2a' formed in the peripheral wall 2a of the housing 2, and the ring chamber 8 is in communication with the interior of the cable outlet portion 2'. The cable outlet portion 2' has an opening end 2'a so that the outer end portion of the flat cable 10, i.e., the end portion of the cable at the side of the outer housing 2, may be pulled out to the outside of the outer housing 2 via the opening end 2'a. Although no illustration showing the assembled form of the brushless electric signal transmission apparatus is given, both ends of the flat cable 10 are respectively engaged with the outer and inner housings 2, 4 via two plug-type connectors, mentioned later. However, the inner housing 4 is allowed to rotate relative to the outer housing 2 although the housings 2, 4 are coupled to each other via the flat cable 10, as described above. If the inner housing 4 is rotated in the forward or reverse direction, the inner housing is allowed to rotate, with the flat cable 10 wound or unwound within the ring chamber 8. Incidentally, the allowable number of rotations of the inner housing is set depending on the maximum number of rotations of the steering wheel.

A first plug-type connector 21 is mounted on the outer end portion of the flat cable which extends through the cable outlet portion 2'. The plug-type connector 21 has male terminals 21a, which are disposed in a line and which are the same in number as a plurality (e.g., four) of first conductors, forming a first group of conductors of the flat cable 10, and a molded portion 21b supporting the outer end portion of the flat cable, the male terminals 21a and two bus bars 31. The molded portion 21b of the connector 21 is detachably or undetachably mounted on the opening end 2'a of the cable outlet portion 2' directly or through appropriate means (not shown), the outlet portion 2 being integral with the outer housing 2. Each of the outer ends of the first conductors, i.e., the ends of the conductors at the side of the outer housing 2, is welded to a counterpart, i.e., a corresponding one of the male terminals 21a, while each of the outer ends of second conductors, which are, e.g., two in number and which form a second group of conductors of the flat cable, is welded to a corresponding one of electric connecting pieces formed at the bus bars 31 and electrically insulated from each other. The molded portion 21b is formed by injection molding in such a manner that the welded portions between the male terminals 21a and the associated conductors and between the bus bars 31 and the conductors concerned are embedded within the molded portion 21b. The individual male terminals 21a are electrically insulated from each other. The male terminals 21a of the plug-type connector 21 serve as a plug.

The plug (i.e., the male terminals 21a) of the first plug-type connector 21 is arranged to be inserted into female terminals (one of which is shown by reference numeral 41a in FIG. 1) of a first socket 41. The socket 41 has female terminals corresponding in number to the male terminals 21a, e.g., four female terminals, and first covered lead wires 51 forming a first group of lead wires and each having flexibility are respectively connected to these female terminals. More specifically, each of the female terminals is pressed to fit to the distal end of an associated one of the covered lead wires 51 whose coverings are peeled off. The female terminals, to which the first covered lead wires 51 are connected in the above manner, are accommodated within a socket housing 41b, to thereby form the first socket 41.

In the illustrated embodiment, the first covered lead wires 51 connected to the first socket 41 are grouped as a single strand 51', and the individual lead wires 51 of the strand 51' are electrically connected to a horn or a controller (not shown) for controlling an automatic driving system provided at the side of the vehicle body, and other devices (not shown), respectively.

At the end portion of the flat cable 10 at the side of the inner housing 4, i.e., at the inner end portion of the cable, a second plug-type connector 22 is mounted, which, as apparent from FIG. 1, is fixed to the flange portion 4a of the inner housing 4 and protrudes outwardly. The second plug-type connector 22 is of the same arrangement as that of the foregoing first-plug type connector 21, and is molded in a manner having a plug comprising an array of male terminals 22a which are respectively welded to the inner ends of the first conductors of the flat cable pulled out from the ring chamber 8 via a cable aperture 4a'' which is formed in the flange portion 4a of the inner housing 4 and through which the flat cable 10 extends, and having two bus bars 32 welded to the inner ends of the second conductors of the flat cable. Reference numeral 22b denotes a molded portion of the connector 22 which is mounted on the flange portion 4a in alignment with the cable aperture 4a".

The plug (i.e., the male terminals 22a) of the second plug-type connector is arranged to be inserted into the female terminals (not shown) of a second socket 42, and third covered lead wires 53, which form a third group of lead wires and which are grouped into a strand 53', are press-fitted to the female terminals. The covered lead wires 53 are electrically connected to a horn switch, an automatic driving switch and the like (not shown) located on the steering wheel.

As a consequence, when the plug (i.e., the male terminals 21a) of the first plug-type connector is inserted into the first socket 41, the covered lead wires 51 of the strand 51' may be simultaneously connected to their corresponding conductors of the flat cable 10. Likewise, the covered lead wires 53 of the strand 53' may also be simultaneously and electrically connected to their counterpart, i.e., corresponding conductors of the flat cable 10 when the plug (i.e., the male terminals 22a) of the second plug-type connector 22 is inserted into the second socket. As a result, the strand 51' connected to the controller at the side of the vehicle body and the strand 53' connected to various switches at the side of the steering wheel are mutually connected via the brushless electric signal transmission apparatus.

On the other hand, at the bus bar 31 of the first plug-type connector 21, the second covered lead wires 52 which form a second group of lead wires and whose distal end coverings are peeled off are electrically connected by welding or soldering to the bus bar 31. The other ends of the covered lead wires 52 are electrically connected to a diagnosis unit or the like (not shown) of the air bag system at the side of the vehicle body.

In addition, fourth covered lead wires 54 whose distal end coverings are peeled off and which form a fourth group of lead wires are electrically connected by welding or soldering to the bus bar 32 of the second plug-type connector 22. The other ends of the covered lead wires 54 are electrically connected to, e.g., an inflator (not shown) of the air bag system at the side of the steering wheel.

According to the present embodiment, therefore, upon assemblage of the apparatus, that is, upon connection between respective ends of most part of the conductors of the flat cable 10 and the covered lead wires concerned, such electrical connection of these elements can be simultaneously established by connector-coupling the plug of the connector at the side of the flat cable 10 with the socket at the side of the strand. On the other hand, at respective ends of the remaining part of the conductors of the flat cable 10, the covered lead wires 52 and 54 are welded or soldered to the bus bars 31 and 32, so as to establish the electric connection therebetween.

In this manner, when the brushless electric signal transmission apparatus of this embodiment is assembled, the electrical connection between the covered lead wires and the flat cable 10 is mostly achieved by means of the connector coupling, and, only those covered lead wires for which high reliability is required, i.e., the covered lead wires 52 and 54, are welded or soldered to the conductors of the flat cable via the bus bars 31, 32. As a result, the welded or soldered portions can be reduced to a minimum, to thereby greatly improve the efficiency of the connecting work. Therefore, the percentage of automated manufacture of the apparatus is increased, so that its production cost can be reduced while at the same time its quality can be improved.

Figure 3:
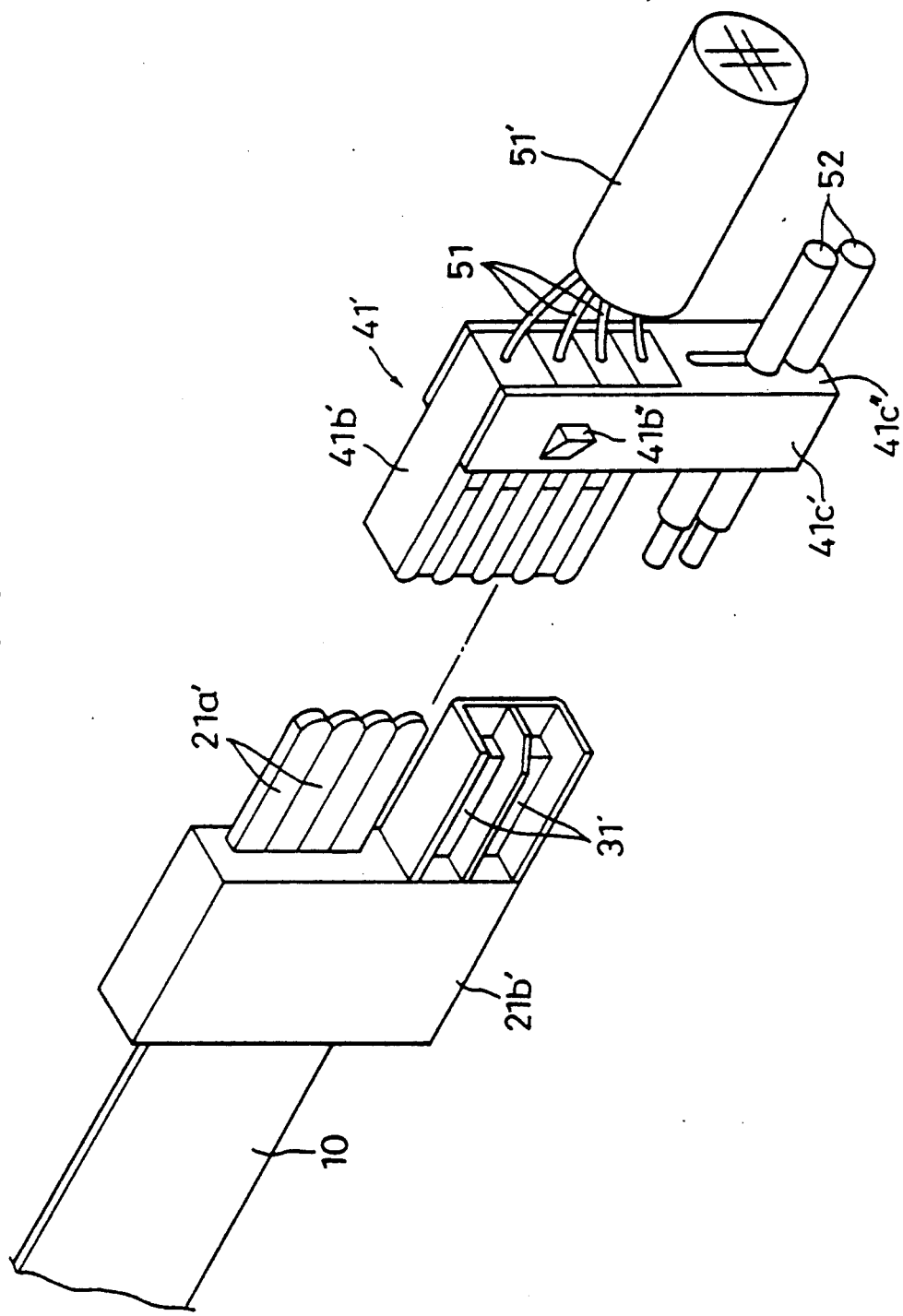
FIG. 3 is a fragmentary perspective view illustrating part of a brushless apparatus according to a modified embodiment of the present invention.

The present invention is not necessarily limited to the foregoing embodiment, but various modifications thereof may be made. For instance, referring to FIG. 3, a modification is exemplarily illustrated. In this modification, the second covered lead wires 52 are retained beforehand by means of a clip 41c' mounted to a socket housing 41b' (corresponding to the first socket 41 in the foregoing embodiment) of a socket 41'. More specifically, the clip 41c' is designed to be mounted on the socket housing 41b' by causing engaging protrusions 41b", which is fitted in a groove formed in one clip half, to be engaged with engaging holes formed in the clip half. Further, the clip 41c' is arranged so as to chuck the second covered lead wires 52 between its two chucking pieces 41c", which form the other clip half, by an resilient force produced by these chucking pieces, with the second covered lead wires 52 positioned at a predetermined connecting position. Therefore, at the same time the male terminals 21'a (corresponding to the first plug-type connector 21 in the embodiment) are inserted into the socket 41', the covered lead wires 52 can be guided and positioned within the bus bar 31' of the plug-type connector 21'. In the case of brushless apparatus provided with the aforementioned clip 41c', the covered lead wires 52 can be readily handled to further ease their connecting work even if these lead wires 52 are flexible. In the meantime, the socket 41' according to the above-mentioned modification can, of course, be applied to the second socket 42 of the foregoing embodiment.

In the embodiment, the brushless electric signal transmission apparatus applied to the steering wheel has been shown. However, the present invention is not restricted to such an application, but may be applied to various apparatuses in which the transmission of electric signals between the stationary side and the rotary side is required.

Further, in the embodiment, the connectors 21, 41 and 22, 42 are employed for the connection between the ends of the flat cable conductors on the inner and outer housing sides (i.e., the respective opposite ends of the conductors) and the associated lead wires (first and second covered lead wires), while both the ends of the remaining conductors and the associated lead wires (second and fourth lead wires) are connected via the bus bars 31, 32. However, the present invention is not restricted to such an arrangement. For example, the connector may be used only to connect the respective ends of the flat cable conductors on the inner or outer housing side (i.e., the respective one ends of the conductors) and the covered lead wires concerned. In addition, the second and fourth covered lead wires 52, 54 and the flat cable conductors may be directly welded without using the bus bars 31, 32. Furthermore, the flat cable conductors may be connected to the socket of the connector while the covered lead wires may be connected to the plug of the connector, although, in the foregoing embodiments, the flat cable conductors are connected to the plug and the covered lead wires are connected to the socket.

What is claimed is:

1. A brushless electric signal transmission apparatus comprising:
   an inner housing;

an outer housing, said inner and outer housing being rotatably coupled together;

a flat cable including a plurality of conductors, said flat cable being housed in a spiral form within a ring chamber defined by said inner and outer housings, said flat cable being wound or unwound during relative rotation of said inner and outer housings;

first covered lead wires connected to a number of said plurality of conductors of said flat cable at one end side of said flat cable through a first connector having a first plug and a first socket into which said first plug is inserted; and at least one second covered lead wire connected, by welding or soldering, to a remaining number of said plurality of conductors of said flat cable at said one end side of said flat cable.

2. The apparatus according to claim 1, wherein:

third covered lead wires are connected to a number of said plurality of conductors of said flat cable at another end side of said flat cable through a second socket having a second plug and a second connector into which said second plug is inserted; and at least one fourth covered lead wire is connected, by welding or soldering, to a remaining number of said plurality of conductors of said flat cable at said another end side of said flat cable.

3. The apparatus according to claim 1, wherein:

said outer housing further includes a cable outlet portion having an opening end which is in communication with said ring chamber and through which said flat cable extends; and said first connector is mounted on said opening end of said cable outlet portion.

4. The apparatus according to claim 1, wherein:

said inner housing has a flange portion extending along an open end surface of said outer housing and having a cable aperture through which said flat cable extends; and said first connector is mounted on said flange portion in alignment with said cable aperture of said flange portion.

5. The apparatus according to claim 1, further including:

at least one clip mounted on a joint counterpart of said first connector, said first connector having at least one clip on a joint counterpart, said at least one clip having two chucking pieces for positioning and retaining a corresponding one of said at least one second lead wire.

6. The apparatus according to claim 1, wherein each of said first and second covered lead wires is flexible.

7. The apparatus according to claim 1, wherein corresponding ones of said first and second covered lead wires form a group and are grouped together into a single strand.

8. The apparatus according to claim 2, wherein:

said outer housing further includes a cable outlet portion having an opening end which is in communication with said ring chamber and through which said flat cable extends; and a corresponding one of said first and second connectors is mounted on said opening end of said cable outlet portion.

9. The apparatus according to claim 2, wherein:

said inner housing has a flange portion extending along an open end surface of said outer housing and having a cable aperture through which said flat cable extends; and a corresponding one of said first and second connectors is mounted on said flange portion in alignment with said cable aperture of said flange portion.

10. The apparatus according to claim 2, further including:

at least one clip mounted on a joint counterpart of said first and second connectors, said first and second connectors each having at least one clip on a joint counterpart, said clip having two chucking pieces for positioning and retaining a corresponding one of said second and fourth covered lead wires.

11. The apparatus according to claim 2, wherein each said first, second, third and fourth covered lead wires is flexible.

12. The apparatus according to claim 2, wherein corresponding ones of said first, second, third and fourth covered lead wires form a group and are grouped together into a single strand.

* * * * *